(12) United States Patent
Hayashi

(10) Patent No.: US 6,292,318 B1
(45) Date of Patent: Sep. 18, 2001

(54) DISC RECORDING/REPRODUCING APPARATUS AND MEDIUM HAVING SPIRAL DATA TRACK

(75) Inventor: Nobuhiro Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/111,402

(22) Filed: Jul. 7, 1998

(30) Foreign Application Priority Data

Jul. 9, 1997 (JP) .................................................. 9-184135

(51) Int. Cl.$^7$ ............................... G11B 5/09; G11B 5/596
(52) U.S. Cl. ..................... 360/48; 360/77.02; 360/77.07; 360/77.08; 360/77.05; 360/78.04; 369/44.29; 369/275.4
(58) Field of Search .................................. 369/111, 44.29, 369/275.4; 360/75, 77.07, 77.04, 77.02, 77.08, 48, 77.11, 78.04

(56) References Cited

U.S. PATENT DOCUMENTS

| | | | |
|---|---|---|---|
| 4,107,746 | * 8/1978 | Conway | 360/78.14 |
| 4,636,885 | * 1/1987 | Yamada et al. | 360/77.08 |
| 5,047,880 | 9/1991 | Ohno | 360/78.14 |
| 5,111,345 | * 5/1992 | Muller | 360/78.14 X |
| 5,548,454 | 8/1996 | Kawakubo et al. | 360/72.1 |
| 5,583,712 | * 12/1996 | Brunelle | 360/77.07 |
| 5,619,387 | * 4/1997 | Ottesen et al. | 360/77.08 |
| 5,689,496 | * 11/1997 | Amano | 369/275.4 |
| 5,936,933 | * 8/1999 | Miyamoto et al. | 369/44.13 X |
| 6,035,351 | * 3/2000 | Billings et al. | 360/48 X |

FOREIGN PATENT DOCUMENTS 08249607   9/1996   (JP) .................................. G11B/5/09

* cited by examiner

Primary Examiner—Andrew L. Sniezek
(74) Attorney, Agent, or Firm—Jay H. Maioli

(57) ABSTRACT

A data recording and/or reproducing apparatus which scans a head over a disc on which a servo pattern for moving the head to a predetermined position is recorded in an arc forming a part of a concentric circle. The apparatus comprises a track No. detector and fine signal detector, for detection of the servo pattern, a circumferential position detector to detect a circumferential position on the disc, an offset calculator to calculate an offset of a current position on the disc from the detected circumferential position, and a positional difference calculator. The calculated offset of the current position is added to the positioning signal to control the head scanning orbit on the disc to be spiral.

14 Claims, 11 Drawing Sheets

SERVO ZONE

DATA ZONE

DISC RECORDING/REPRODUCING APPARATUS AND MEDIUM HAVING SPIRAL DATA TRACK

BACKGROUND OF THE INVENTION

1. Field of the Invention

The present invention relates to an apparatus for digitally recording and/or reproducing data into and/or from a disc-shaped recording medium such as a magnetic disc, optical disc or the like, and a disc-shaped recording medium usable in the apparatus and into and/or from which data is recorded and/or reproduced.

2. Description of Related Art

Conventionally, to record information into a magnetic disc, a magnetic head is moved radially of a magnetic disc based on positioning information to move a magnetic head to a predetermined position, which is being reproduced.

The head positioning information is usually called "tracking servo signal" and composed of a so-called track address indicative of a data track number, and a fine signal indicative of a fine position in the data track. Generally, the tracking servo signal is recorded on a magnetic disc beforehand by means of a device called "servo writer".

The tracking servo signal is recorded in zones defined by segmenting a magnetic disc circumferentially. Of such zones, a one where a tracking servo signal is recorded will be referred to as "servo zone" herebelow, and a zone where no tracking servo signal is recorded, namely, where data is recorded, will be referred to as "data zone" herebelow. Such a common disc format is illustrated by way of example in FIG. 1. In the illustrated example in FIG. 1, the servo zones count twelve in number but an actual disc consists of tens to hundreds of servo zones.

The configuration of a common servo zone is illustrated in detail by way of example in FIG. 2.

In the example illustrated in FIG. 2, the servo zone consists of a track address indicative of a data track No., a fine signal indicative in detail of a position in the data track, and a clock mark located between the track address and fine signal to extract a sync clock necessary for reproduction of these signals. All these signals are recorded in a format which is already disclosed, for example, in the U.S. patent application Ser. No. 08/588,020 of the Applicant of this patent application.

FIG. 3 illustrates the configuration of a general tracking servo system of a magnetic disc drive, showing major components of the system. It should be noted that another tracking servo system is not illustrated in FIG. 3.

As seen from FIG. 3, a magnetic head 9 reproduces a signal from a magnetic disc 11. The reproduced signal is amplified by a reproduction amplifier 15, and then converted to a digital signal by an A/D (analog/digital) converter 16. For acquisition of tracking servo signals, the digital signal is passed to a track No. detector 17 and a fine signal detector 19. From the digital signal, the track No. detector 17 detects a track No. while the fine signal detector 19 detects a fine signal. Thus, the track No. signal and fine signal are extracted as tracking servo signals. When reproduced, the fine signal shows a value of 0 when the magnetic head 9 is positioned in the center of a data track, for example, and a value of ±0.5 when the magnetic head 9 is positioned ±½ of one track pitch off the center of the data track.

A current position calculator 18 is provided to calculate from the detected tracking servo signal a radial position where the magnetic head 9 exists, and a value indicative of the radial position is passed to a positional difference calculator 8 which is also supplied with a value of a target position. In this positional difference calculator 8, a difference between the radial and target positions is determined.

Also a positioning compensator 14 is provided to generate a VCM (Voice Coil Motor) control signal for the difference between the radial and target positions to be zero. The VCM control signal is converted to an analog signal by a D/A (digital/analog) converter 13, and then passed to a VCM driver 12 which drives a VCM (voice coil motor) 10. The voice coil motor (VCM) 10 moves the magnetic head 9 radially over the magnetic disc 11.

It should be appreciated that for continuous recording and reproduction of large amount of data, a faster access is possible to a spiral data track rather than to a concentric data track. It is assumed here that a greater amount of data than recordable on one track for one round of a magnetic disc is to be recorded on the magnetic disc. If the magnetic disc has data tracks formed concentrically thereon, data for one data track is first recorded, and then the magnetic head is moved to a next data track for recording the rest of the data. On the contrary, if the magnetic disc has a data track formed spirally thereon, data can be continuously recorded on the track without the necessity of moving the magnetic head from one track to another as in the magnetic disc having the concentric data tracks.

Also in a magnetic disc having concentric data tracks, a time required for the magnetic head to move from one to a next of the concentric data tracks formed on the magnetic disc varies and it is difficult to assure that the magnetic head can be moved from one to another track within a predetermined time. Therefore, a magnetic disc having such concentric data tracks is not so much suitable for recording and reproducing an information which should be real-time or continuously recorded or reproduced, such as image information, for example. A magnetic disc having a data track formed spirally thereon is suitably usable for such a purpose.

Usually, however, a tracking servo signal is recorded concentrically on a magnetic disc, and it is extremely difficult to record the signal spirally on a magnetic disc. For recording or reproducing data with respect to a magnetic disc having concentric data tracks formed thereon, it suffices to move the magnetic head a half track pitch when positioning information is recorded concentrically on the magnetic disc by means of a servo writer. For spiral recording of the positioning information, however, it is necessary to move the magnetic head over tens to over hundreds of one track pitch. It is very difficult to attain such a high accuracy in moving the magnetic head over the magnetic disc.

Conventionally, data recording and/or reproduction into and/or from a magnetic disc is thus made with respect to the concentric data tracks formed on the magnetic disc.

SUMMARY OF THE INVENTION

Accordingly, the present invention has an object to overcome the above-mentioned drawbacks of the prior art by providing data recording and/or reproducing apparatus adapted to form a spiral data track on a disc-shaped recording medium without an improved accuracy of the conventional servo writer, and a disc-shaped recording medium usable in the apparatus.

The above object can be accomplished by providing a data recording and/or reproducing apparatus in which a signal recording and/or reproducing head is scanned over a disc-shaped recording medium on which a positioning signal to move the signal recording and/or reproducing head to a predetermined position is recorded along an arc of a concentric circle, comprising, according to the present invention, a means for detecting a positioning signal recorded along the arc, a means for detecting a circumferential position on the disc-shaped recording medium, and a means for calculating an amount of offset from a signal indicative of the detected circumferential position, the calculated offset amount being added to the positioning signal to control the head for a scan along a spiral orbit.

Also the above object can be accomplished by providing a disc-shaped recording medium having recorded along an arc of a concentric circle thereon a positioning signal to move a signal recording and/or reproducing head to a predetermined position and also having a data track formed spirally thereon.

According to the present invention, a servo writer having a nearly same accuracy as in the conventional ones can be used to record a tracking servo signal and a data track may be formed spirally based on the tracking servo signal, thereby permitting to record and/or reproduce a large volume of data at a high speed.

BRIEF DESCRIPTION OF THE DRAWINGS

These objects and other objects, features and advantages of the present invention will become more apparent from the following detailed description of the preferred embodiments of present invention when taken in conjunction with the accompanying drawings, of which.

DETAILED DESCRIPTION OF THE PREFERRED EMBODIMENTS

Prior to proceeding to a detailed description of the preferred embodiments of the present invention, the principle of the present invention will be discussed herebelow in comparison with the prior art for a better understanding of the present invention.

According to the present invention, a conventional servo writer adapted to record on a magnetic disc a tracking servo signal under which a magnetic head is moved about a half track pitch at each time, can be used to record on each of concentric data tracks formed on the magnetic disc a servo signal including a tracking servo signal under which a data track is formed spirally on the magnetic disc.

To this end, information indicative of a circumferential position on the magnetic disc is recorded beforehand in a part of the tracking servo signal. By reproducing this information, it is possible to know a relative angle θ (radian) from a disc-circumferential reference point at a position where the magnetic head exists.

Of the tracking servo signal, a track address may be regarded as an integer part of a radius of the magnetic disc, and a fine signal as a decimal part of the radius. Therefore, under an assumption that a track address provided by reproducing the tracking servo signal is a and a fine signal is f (−0.5<f<0.5), the radial position of the magnetic head can be expressed as follows:

$$r = a + f \qquad (1)$$

Generally in the conventional apparatus, the magnetic head is subjected to such a tracking servo control that a signal of zero is obtainable from the fine signal, namely, $$r = a \qquad (2)$$

On the contrary, the magnetic head is subjected to such a tracking servo control that the radial position thereof is as follows:

$$r' = a + \theta/2\pi \qquad (3)$$

Thus, when the magnetic disc is rotated one around, a spiral data track is formed which is offset one track pitch from the preceding one.

Assume here that a magnetic disc has a number n of servo zones and a number m of servo zones from a circumferential reference point under data reproduction. Then, a following relation can be obtained:

$$r' = a + m/n \qquad (4)$$

Therefore, no complicated calculation is required for formatting the magnetic disc.

More particularly, the present invention permits to use a servo writer having a nearly same accuracy as that of the conventional servo writer to record a tracking servo signal under which a data track can be formed spirally on a magnetic disc, thereby permitting to record and/or reproduce a large amount of data at a high speed.

Figure 1:
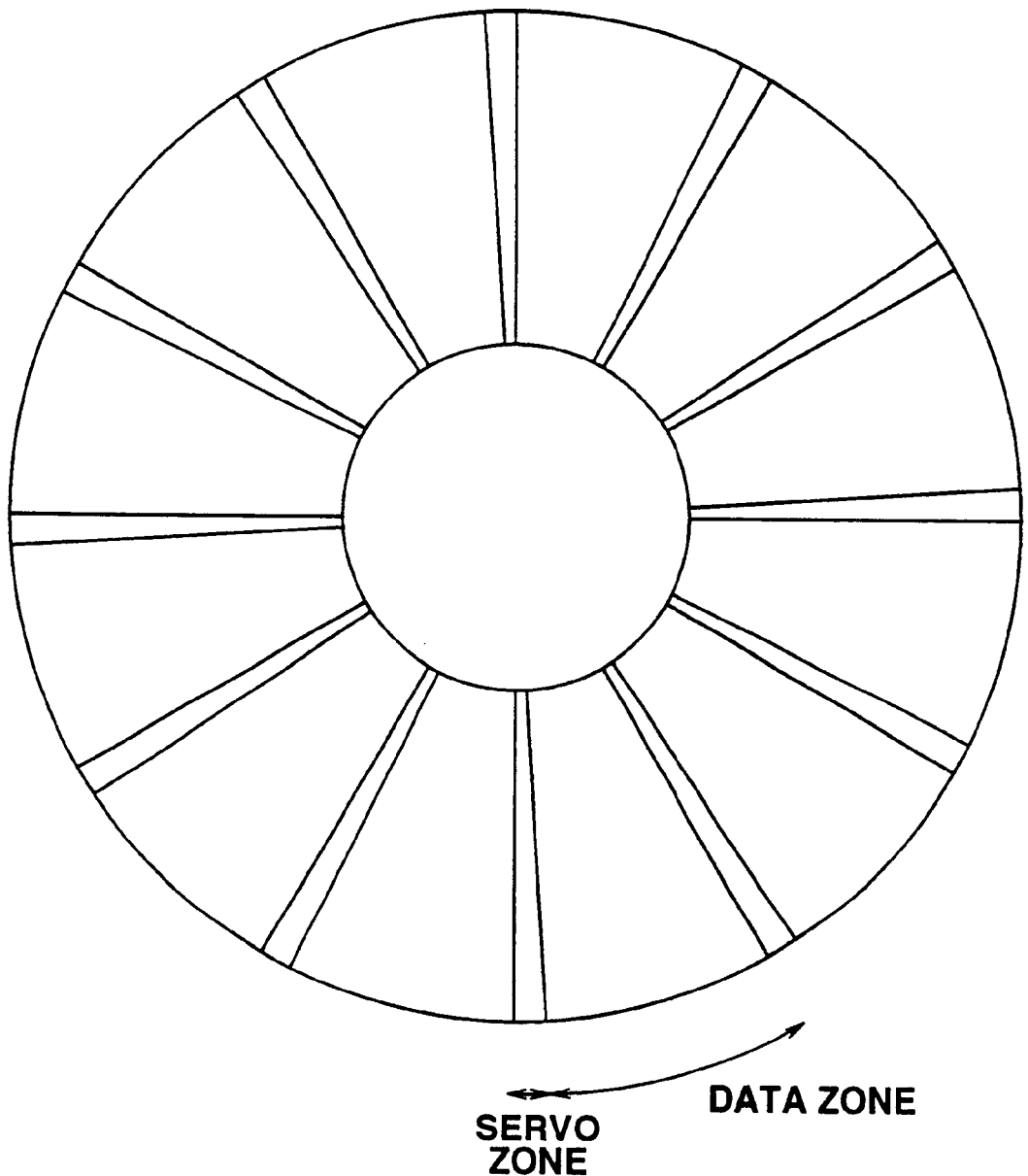
FIG. 1 is a sketch of a common disc format.
Figure 2:
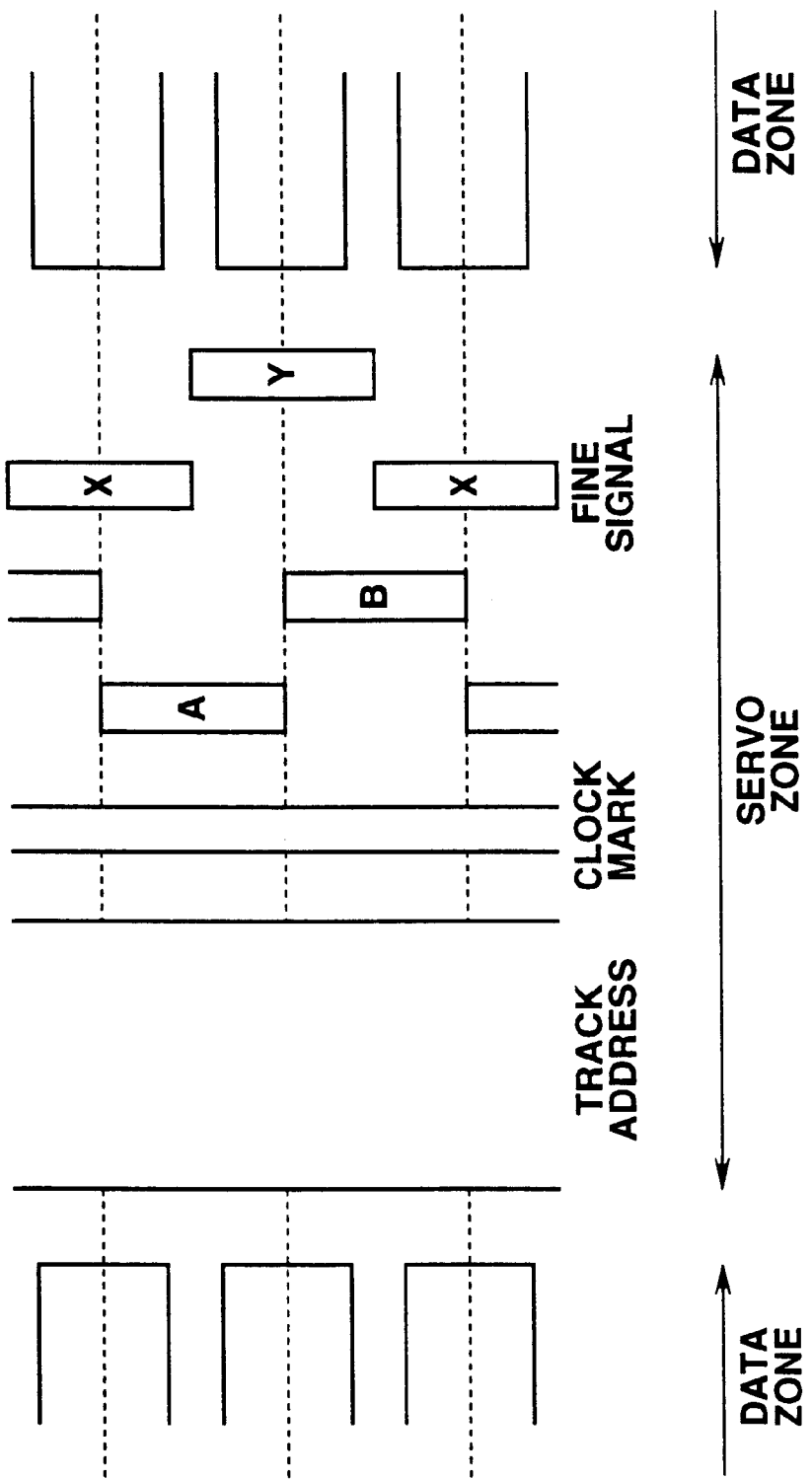
FIG. 2 illustrates the configuration of a servo zone.
Figure 3:
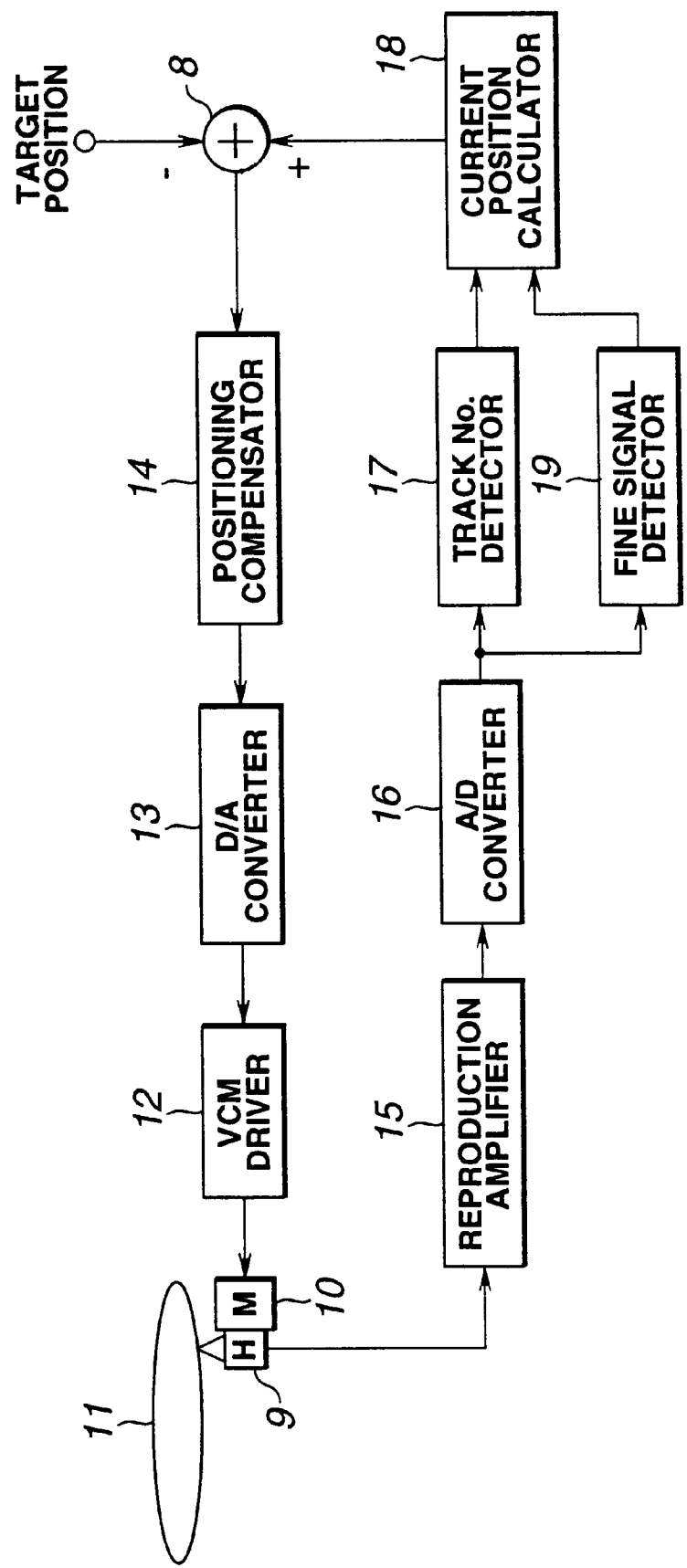
FIG. 3 is a schematic block diagram of a tracking servo system in a common magnetic disc drive, showing its major components of the system.

To implement the above, the data recording and/or reproducing apparatus (magnetic disc drive) according to the present invention uses a magnetic disc formatted so that servo zones and data zones are formed alternately as illustrated in FIG. 1. The servo zone in the disc format has a detail configuration as illustrated in FIG. 2. As seen from FIG. 2, one round of the magnetic disc includes tens to hundreds of servo zones. Of the servo zones, a certain one (or some) has recorded in a track address recording zone a special pattern indicative of a disc-circumferential reference point (will be referred to as "home index" hereafter). When reproduced, the special pattern reveals the position of the home index.

Figure 4:
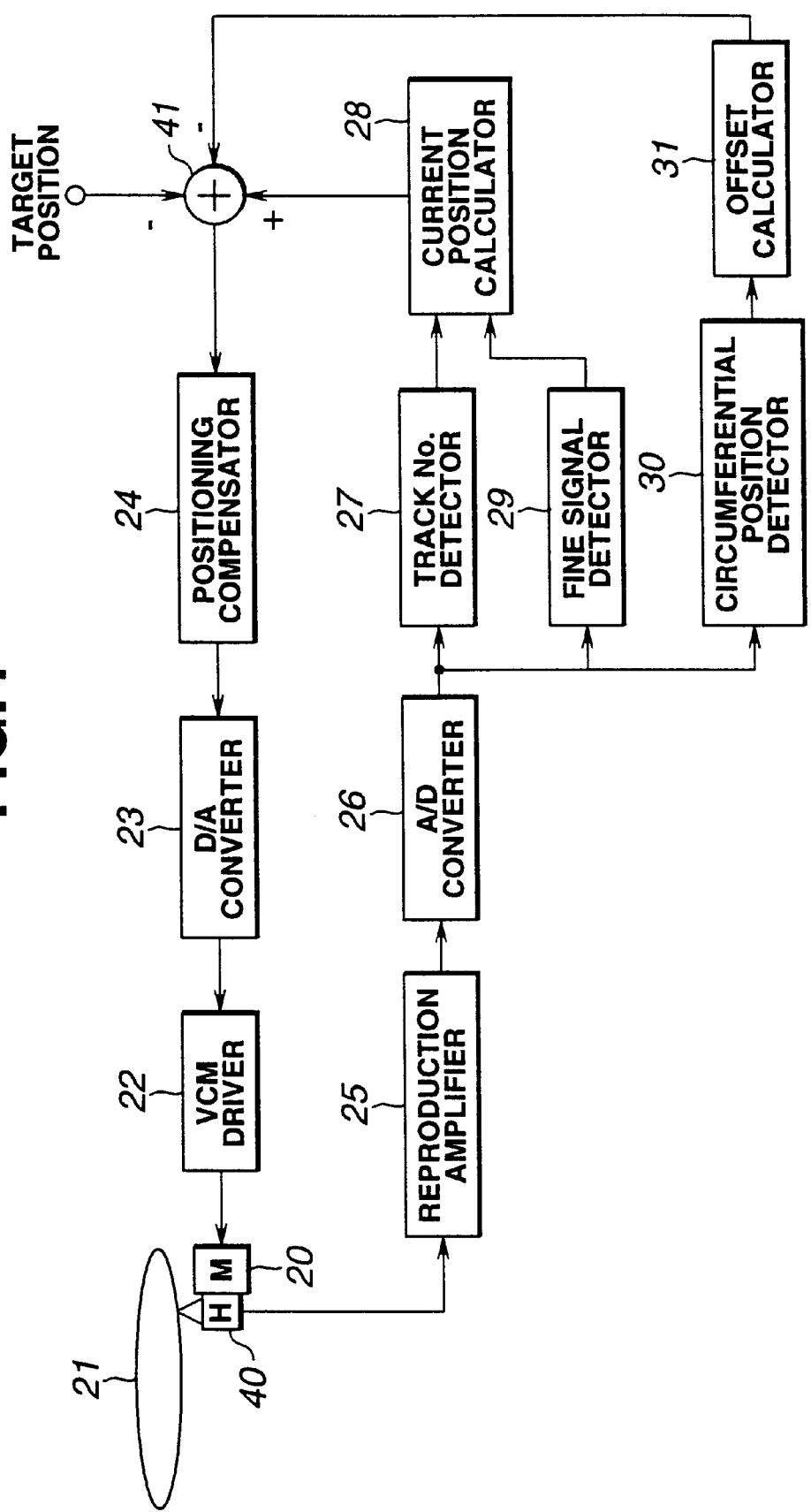
FIG. 4 is a schematic block diagram of a tracking servo system in a magnetic disc drive according to a first embodiment of the present invention, from the detected tracking servo signal, showing major components of the system.

FIG. 4 shows the configuration of a tracking servo system consisting of major components in a magnetic disc drive according to the first embodiment of data recording and/or reproducing apparatus of the present invention. It should be noted that another configuration of the tracking servo system is not illustrated in FIG. 4.

As illustrated in FIG. 4, a signal reproduced from a magnetic disc 21 by a reproducing or magnetic head (will be referred to simply as "head" hereinafter) 40 is amplified by a reproduction amplifier 25, and then converted to a digital signal by an A/D converter 26. From this digital signal, a track No. detector 27 detects a track No. while a fine signal detector 29 detects a fine signal. These track No. and fine signals are extracted as the tracking servo signals. When the fine signal is reproduced, a value of 0 is provided when the head 40 is positioned in the center of a data track, for example, and a value of ±0.5 is provided when the head 40 is offset ±½ of one track pitch from the center of the data track.

A current position calculator 28 is provided to calculate a radial position of the head 40 from the detected tracking servo signal, and a value indicative of the radial position is passed to a positional difference calculator 41.

Further, a circumferential position detector 30 is provided to detect, from the digital signal delivered from the A/D converter 26, how many servo zones have been counted from the disc circumferential reference point. To this end, the circumferential position detector 30 comprises a home index detector and a counter which counts servo zones over which the head 40 has moved after passing by the home index.

An offset calculator 31 is provided to calculate an offset amount from the current servo zone No. Under an assumption that a number of servo zones per round of the magnetic disc is m and the current servo zone No. is n (0<n<m), the offset calculator 31 calculates the offset amount using the following relation:

$$\text{Offset} = n/m - 0.5 \quad (5)$$

The offset amount calculated by the offset calculator 31 is supplied to the positional difference calculator 41.

The positional difference calculator 41 is also supplied with a signal indicative of a target position, and determines a difference between a sum of the target position and offset amount and the current radial position.

Also a positioning compensator 24 is provided to generate a VCM control signal for no difference between the sum of the target position and offset amount and the current radial position. The VCM control signal is converted to an analog signal by a D/A converter 23, and then supplied to a VCM driver 22 which drives a VCM 20. The voice coil motor (VCM) moves the head 40 radially over the magnetic disc 21.

Figure 5:
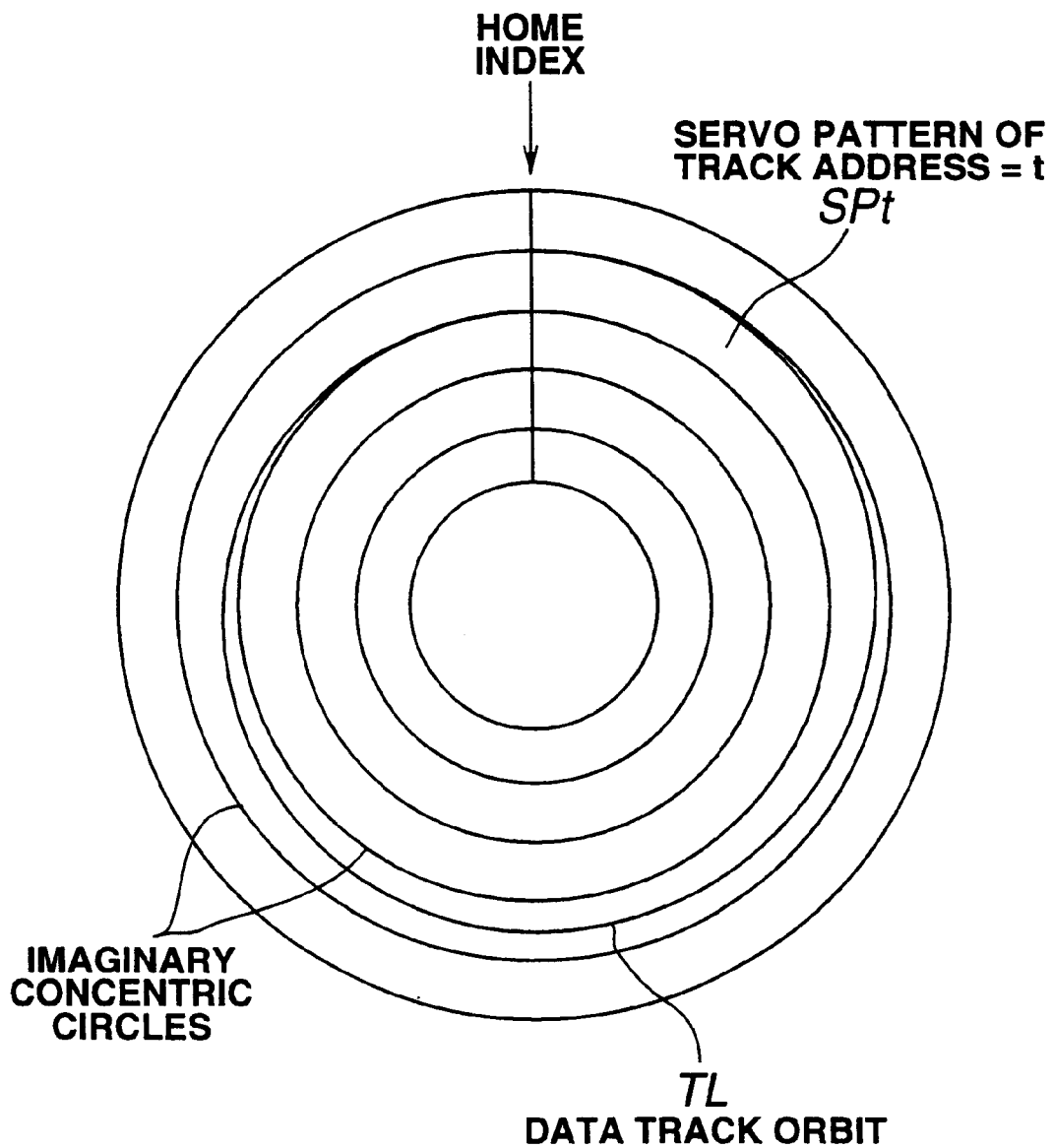
FIG. 5 is an explanatory drawing of a spiral data track orbit on the magnetic disc in the first embodiment.

The aforementioned tracking servo system in the magnetic disc drive according to the first embodiment of the present invention functions as will be described herebelow with reference to FIG. 5:

In FIG. 5, imaginary concentric circles are depicted with solid lines. A servo signal for each track is recorded on the magnetic disc 21 concentrically along each circle shown with the solid line. Each of the imaginary concentric circles is depicted with a continuous solid line, but it should be appreciated that actual servo zones and data zones are formed alternately as illustrated in FIG. 1. As illustrated in FIG. 5, a servo signal indicative of a track No. t given as a target position is recorded in a concentric track indicated with a reference SPt.

The amount of offset calculated by the offset calculator 31 is −0.5 when the head 40 is in a servo zone in which the home index is present. It will increase as the magnetic disc 21 rotates, and becomes zero when the magnetic disc 21 has rotated a half round from the home index. As the magnetic disc 21 further rotates, the offset amount will be about +0.5 when the head 40 comes in a servo zone just before a next home index.

The amount of offset is added to the target position for positioning the head 40 so that when the magnetic disc 21 has rotated one turn, the head 40 will move across one track obliquely for a servo signal recorded concentrically. Namely, the head 40 will delineate a spiral scanning orbit TL as indicated with a dashed line in FIG. 5.

When the head 40 comes to a servo zone in which a next home index exists, a track No. t+1 is given as a target position, so that the head 40 will be positioned along a continuous spiral scanning orbit.

By recording or reproducing data while positioning the head 40 as in the above, a spiral data track can be formed in a data zone.

It should be appreciated that the signal processing by the offset calculator 31, current position calculator 28, positional difference calculator 41 for calculation of a difference between a target position and a current position, positioning compensator 24, etc. as in FIG. 4 can be done by a software called "Digital Signal Processor (DSP)".

As having been described in the foregoing, the first embodiment of the present invention permits to record a tracking servo signal using a servo writer having a generally same accuracy as the conventional one, that is to say, a servo writer which provides a tracking servo signal to move the head a half track pitch, form a data track spirally based on the tracking servo signal, and thus record or reproduce a large amount of data at a high speed.

In the first embodiment, the head is continuously moved from the inner toward the outer circumference of the magnetic disc, for example, while the head is under tracking. Therefore, in case recording, for example, of a certain amount of data is followed by a slight idling time before a next data is transmitted from a host computer, and then followed by recording of remaining data in a data track next to a one where the data has been recorded, that is to say, when an intermittent recording is done, the head will have moved continuously along the spiral data track orbit toward the outer circumference. Therefore, a seeking operation for return to a position where the recording is complete, is required.

Figure 6:
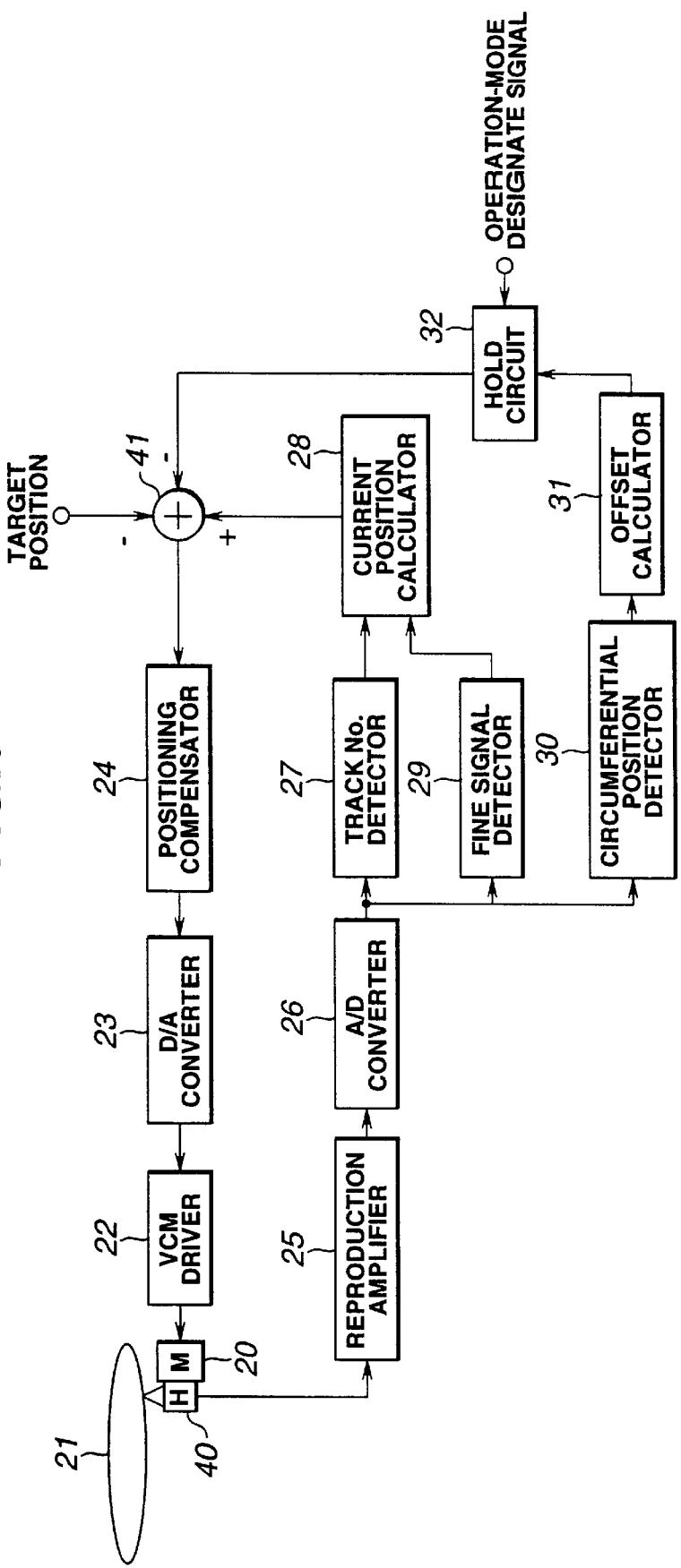
FIG. 6 is a schematic block diagram of a tracking servo system in a magnetic disc drive according to a second embodiment of the present invention from the detected tracking servo signal, showing major components of the system.

To meet the above requirement, the second embodiment of the present invention further comprises a hold circuit 32 as illustrated in FIG. 6, in addition to the major components shown in FIG. 4. Thus, it is also possible to change or hold an amount of offset depending upon whether the apparatus is recording or reproducing data or idling. It should be noted that in FIG. 6, same components as in FIG. 4 are indicated with same references and they will not be further described.

In the second embodiment, when an operation-mode designate signal supplied from a host computer, for example, indicates that a data recording or reproduction is in progress, an offset amount as in the first embodiment is added to a target position by the hold circuit 32. Thus, the head 40 is spirally tracked during the data recording or reproduction.

On the contrary, when the operation-mode designate signal indicates an idling for no data recording or reproduction, the hold circuit 32 holds an offset amount constant. Thus, during the idling, the head 40 is tracked concentrically and thus stays continuously at a same radius on the magnetic disc 21.

As having been described in the foregoing, the second embodiment of the present invention permits to prevent the head from moving along the spiral data track orbit during suspension of an intermittent data recording or reproduction, thereby making it unnecessary, for resuming the interrupted recording or reproduction, to return the head to a position where the recording or reproduction has been interrupted.

Therefore, the recording or reproduction once suspended can be resumed quickly, that is to say, a speedy access is possible to a desired data track.

For continuous recording or reproducing a large amount of data, a spiral data track is advantageous in that it allows speedy access to a data track. According to the present invention, however, concentric data tracks can be formed for the purpose of frequent intermittent recording or reproducing a relatively small data such as character information.

Figure 7:
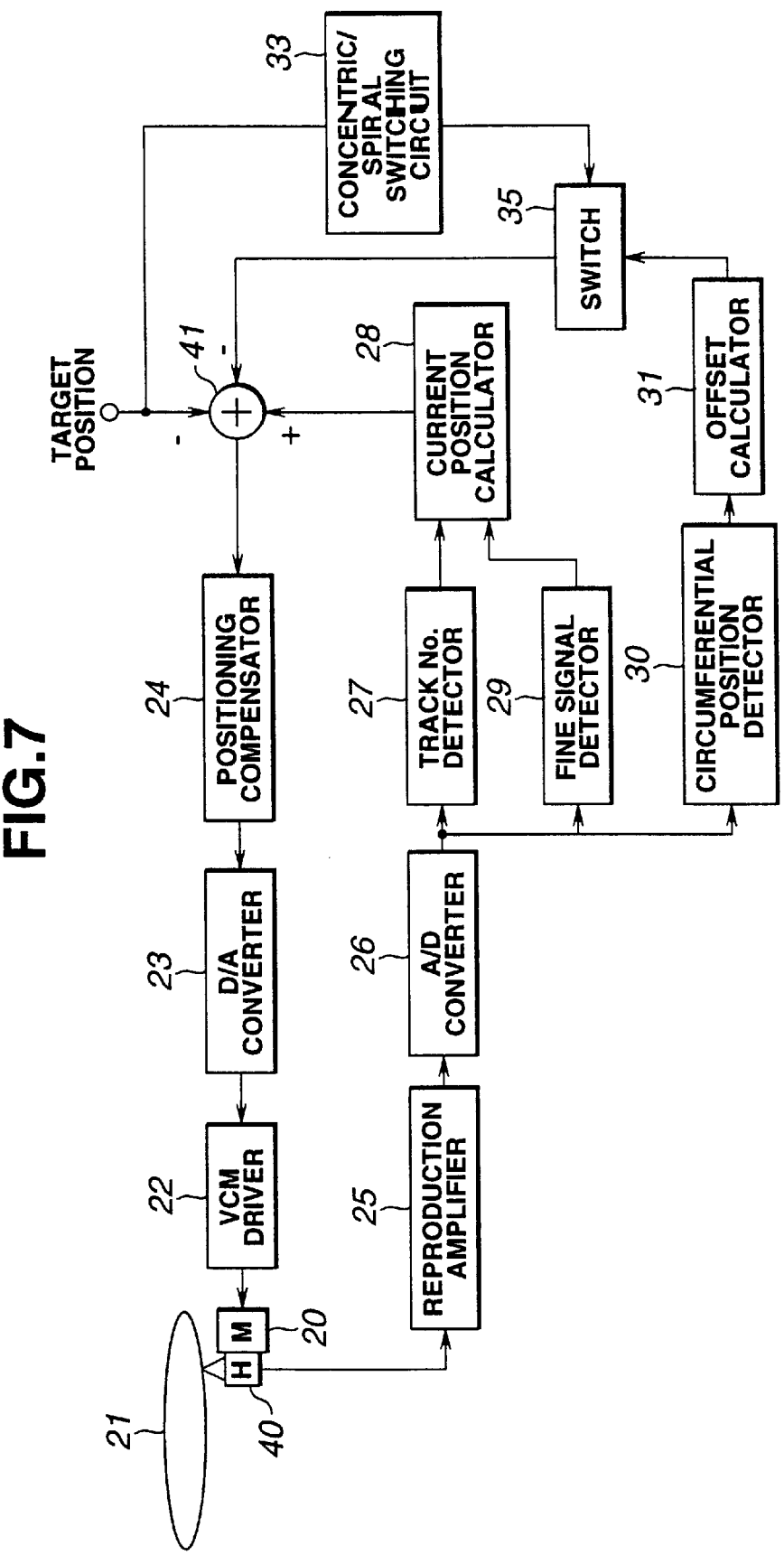
FIG. 7 is a schematic block diagram of a tracking servo system in a magnetic disc drive according to a third embodiment of the present invention from the detected tracking servo signal, showing major components of the system.

FIG. 7 illustrates an example of the configuration of the third embodiment which can implement the above. It should be noted that in FIG. 7, same components as in FIG. 5 are indicated with same references and they will not be further described.

According to this embodiment, the magnetic disc drive is adapted to form on a magnetic disc 21 a zone in which concentric data tracks are formed and a zone in which a spiral data track is formed. For this purpose, the magnetic disc drive further comprises, in addition to the major components shown in FIG. 4, a concentric/spiral switching circuit 33, and a switch 35.

The concentric/spiral switching circuit 33 selects which is to be formed on the magnetic disc 21 concentric data tracks or a spiral data track. The switch 35 is turned on or off, under a select signal supplied from the concentric/spiral switching circuit 33, to supply or not an offset amount from the offset calculator 31 to the positional difference calculator 41.

To form a spiral data track, for example, on the magnetic disc 21, the concentric/spiral switching circuit 33 delivers a switch-on signal to close the switch 35 through which the offset amount is added to the target position. Thus, the head 40 is tracked spirally.

On the other hand, when it is intended to form concentric data tracks on the magnetic disc 21, a switch-off signal is supplied from the concentric/spiral switching circuit 33 to the switch 35 which will thus be turned off so that the offset amount will not be added to the target position. Thus, the head 40 is tracked concentrically.

As having been described in the foregoing, the third embodiment permits to form on a same magnetic disc 21 a spiral data track and concentric data tracks together either of which can be used depending on the type of information to be recorded or reproduced, thereby permitting an optimum run of the magnetic disc drive.

In the first embodiment having previously been described, the amount of offset is calculated using the following:

$$\text{Offset} = n/m - 0.5 \quad (6)$$

However, to select whether a spiral data track along which the head 40 will be moved from the inner toward outer circumference, or vice versa, is formed on the magnetic disc 21, the above relation is changed as follows for use in the fourth embodiment of the present invention:

$$\text{Offset} = -(n/m - 0.5) \quad (7)$$

Figure 8:
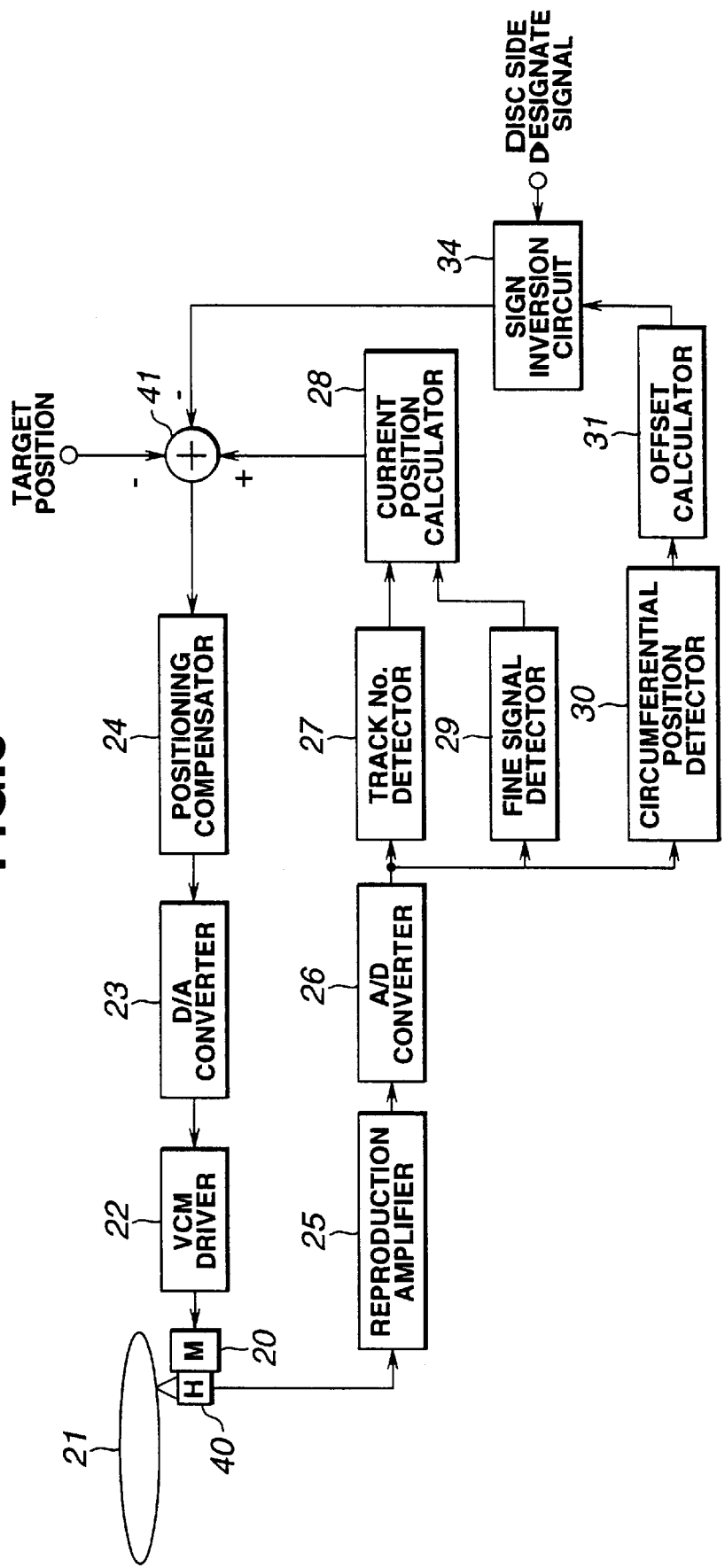
FIG. 8 is a schematic block diagram of a tracking servo system in a magnetic disc drive according to a fourth embodiment of the present invention from the detected tracking servo signal, showing major components of the system.

FIG. 8 illustrates an example of the configuration of the fourth embodiment which can implement the above. It should be noted that in FIG. 8, same components as in FIG. 5 are indicated with same references and they will not be further described The fourth embodiment will be explained concerning an example in which a spiral data track is formed on one of the front and rear sides of a magnetic disc 21. A spiral data track formed on one side being an inversion of a one formed on the other side.

The magnetic disc drive according to the fourth embodiment illustrated in FIG. 8 further comprises, in addition to the major components shown in FIG. 4, a sign inversion circuit 34 which is supplied with a side designate signal from a host computer or the like, for example. The side designate signal designates either the front or rear side of a magnetic disc 21 where a spiral data track is to be formed. Thus, a spiral data track can be formed on one side of the magnetic disc 21 to be an inversion of a one that is formed on the other side.

A spiral data track along which the head 40 is moved from the inner toward outer circumference can be formed on the front side, for example, of a magnetic disc 21, while a spiral data track along which the head 40 is moved from the outer toward inner circumference can be formed on the rear side.

Assume here that data recording is to be started at the inner circumference of the front side of the magnetic disc 21 and made in all data zones on the front side. In this case, the head 40 will stay at the outermost circumference of the front side of the magnetic disc 21. With the head 40 moved to a position for reading the rear side of the magnetic disc 21 and the sign of the offset amount changed by the sign inversion circuit 34, the head 40 can record data along the spiral data track while moving from the outer toward inner circumference.

If a double head 40 consisting of two heads for the front and rear sides, respectively, of a magnetic disc 21 is used and both the heads are movable by a head arm while being interlocked with each other, it will not be necessary that a single head 40 should be moved from the front to rear side of a magnetic disc 21, or vice versa, for reading or writing data on each side of the magnetic disc 21.

As having been described in the foregoing, the fourth embodiment of the present invention permits to form a spiral data track on the front side of a magnetic disc 21 and on the rear side an inverted one of the spiral data track formed on the front side. Also, if the double head 40 consisting of two heads for the front and rear sides, respectively, of a magnetic disc 21, both the heads being movable by a head arm while being interlocked with each other, could be used as mentioned above, a larger amount of data than recordable on one side of the magnetic disc 21 can be continuously recorded onto the magnetic disc without a head seek time which would be required for moving a single head 40 from one magnetic disc side where data reading is complete to the other disc side, and thus data can be recorded or reproduced at a high speed.

Figure 9:
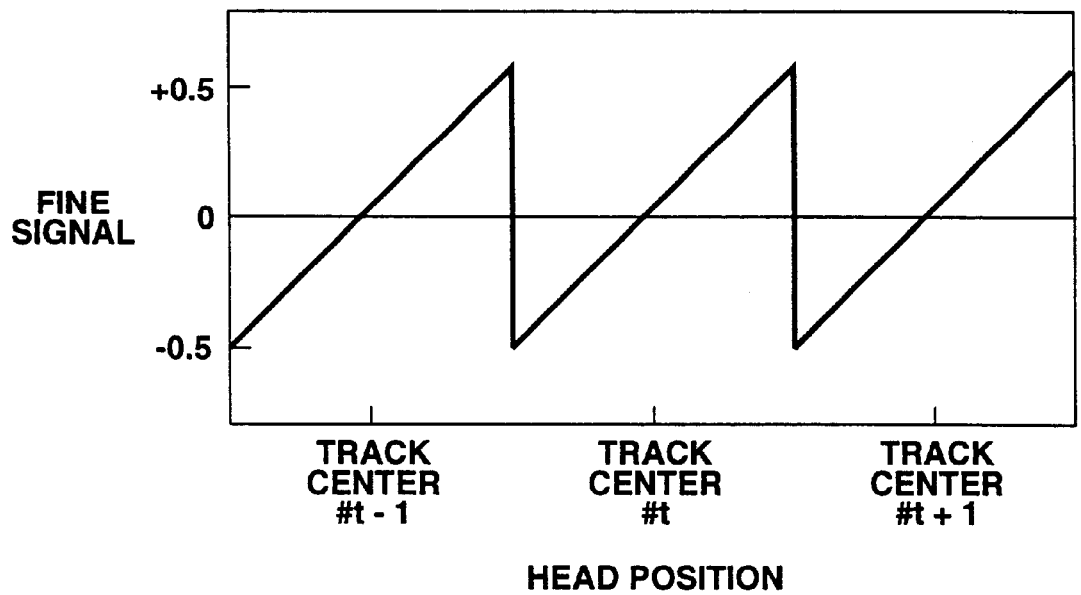
FIG. 9 illustrates an example of an ideal fine signal detection characteristic.
Figure 10:
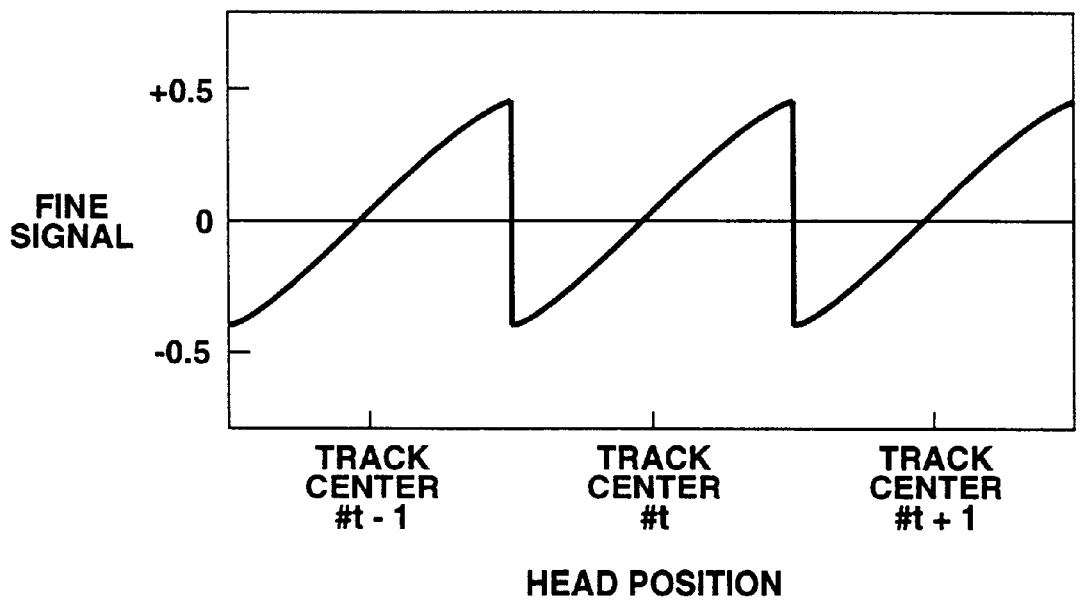
FIG. 10 illustrates an example of a fine signal detection characteristic of an actual magnetic disc drive.

In each of the aforementioned embodiments of the present invention, a fine signal detected by the fine signal detector 29 should preferably have an ideal characteristic as shown in FIG. 9. That is to say, it is ideal that the fine signal has a value of 0 when the reproduction or head 40 is just aligned with the data track and it has values of −0.5 when the head 40 is a half track pitch off the track. In practice, however, as the head 40 is off, that is to say, beyond or short of, the center of the data track because the track pitch is not precisely coincident with the width of the head 40 or for a similar reason, the characteristic line will deviate from a straight line illustrated in FIG. 9, as illustrated in FIG. 10. If the characteristic line is much off the straight line, the radial position of the head 40 will not accurately reflect an offset amount calculated in the manner having been described concerning the first to fourth embodiments as the case may be.

Take a case, for example, in which when the offset calculator 31 provides an offset amount of 0.5 in order to position the head 40 a half track pitch off the center of the servo signal where near the home index, the fine signal characteristic is on the order of 0.4 as illustrated in FIG. 10. In this case, since the positional difference of the head 40 with respect to the target position is not 0, no normal positioning is possible.

Therefore, no spiral data track can be formed accurately in the spiral form in this case.

Figure 11:
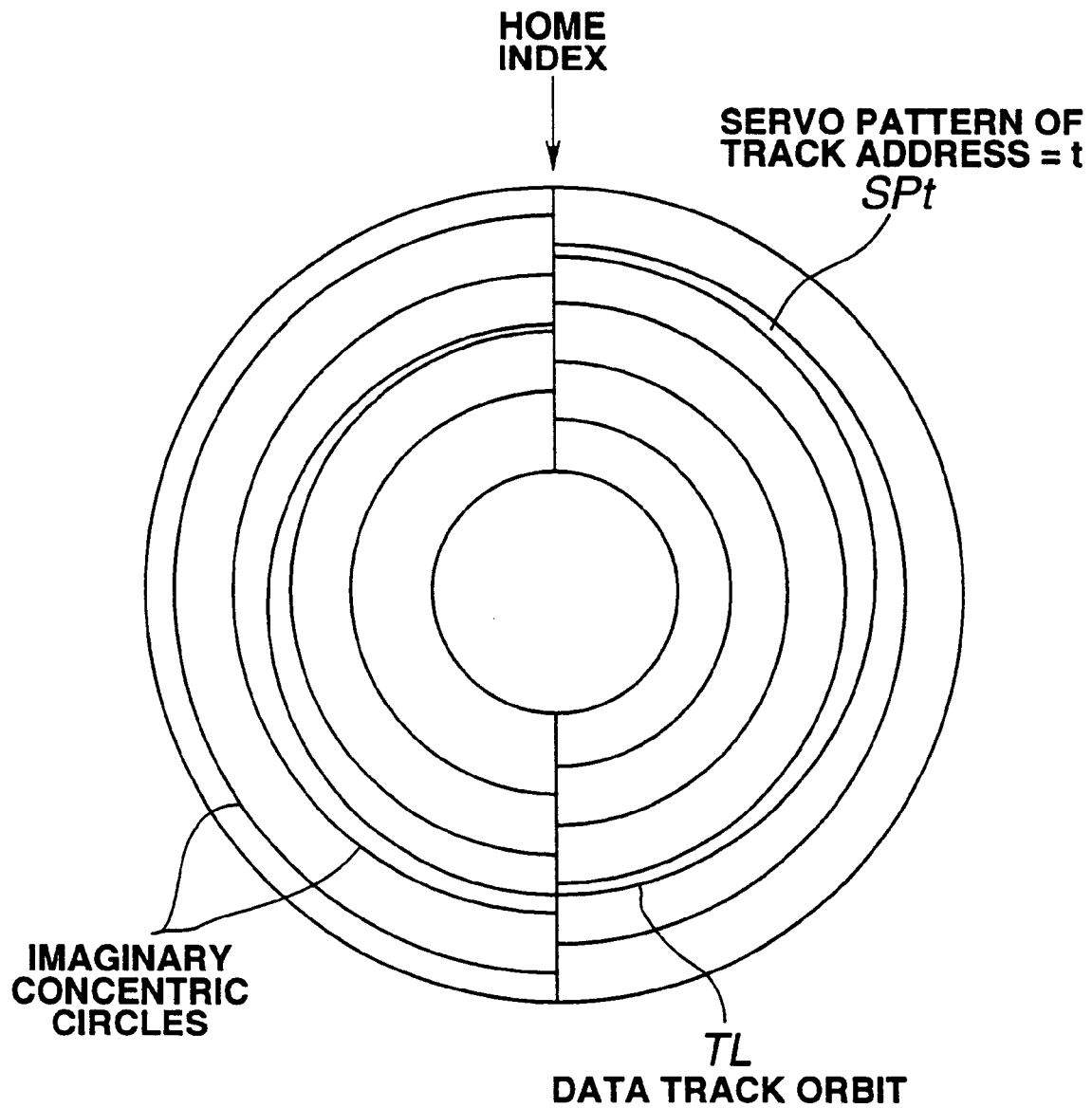
FIG. 11 illustrates, by way of example, a disc format in which semi-circular data tracks are formed according to a fifth embodiment of the present invention.

To solve the above problem, the fifth embodiment is proposed according to which servo signals shifted a half track pitch from one to another at every half round of the magnetic disk are generated as illustrated in FIG. 11. For example, same servo signals are recorded at a position of a same radius for one half round from the home index, while for the other half round, servo signals are recorded at a position of a radius shifted a half track pitch from that in the former half round. The servo writer functions to record fine signals A, B, X and Y at positions shifted a half track pitch from one another, so that a pattern can be easily formed in which servo signals are recorded at positions shifted a half track pitch for each half round of a magnetic disc.

The configuration of the apparatus for forming a spiral data track on a magnetic disc 21 thus formatted is the same as in FIG. 4. In this embodiment, however, the offset calculator 31 calculates an amount of offset as will be discussed below. Namely, it is assumed now that the magnetic disc 21 has formed thereon a number m of servo zones per round and a current servo zone number within which the head 40 stays is n (0<n<m). Under this assumption, an amount of offset is calculated as follows:

When n<m/2, $$\text{Offset} = n/m - 0.25 \qquad (8)$$

When n>m/2, $$\text{Offset} = n/m - 0.75 \qquad (9)$$

The tracking servo system of a magnetic disc drive working as in the fifth embodiment functions as will be described herebelow with reference to FIG. 11.

In FIG. 11, imaginary concentric circles are depicted by semi-circles (two concentric semi-circles, inner and outer) indicated with solid lines. As shown, a signal indicative of a track No. t given as a target position is recorded on a semi-circular track indicated with a reference SPt.

The amount of offset calculated by the offset calculator 31 is −0.25 when the head 40 is within a servo zone including the servo index. The offset amount will increase as the magnetic disc 21 rotates. When the magnetic disc 21 has rotated a quarter round from the home index, the amount of offset will be 0. As the magnetic disc 21 further rotates, the amount of offset will increase correspondingly. When the magnetic disc 21 reaches a position just before it will have rotated a quarter round from the home index, the offset amount will be +0.25. Furthermore, when the head 40 is within a next servo zone, the offset amount is −0.25. As the magnetic disc 21 rotates, the offset amount will increase as mentioned above. When the magnetic disc 21 has rotated three fourths of a round from the home index, the offset amount will be 0. As the magnetic disc 21 further rotates, the offset amount will increase correspondingly. When the magnetic disc reaches a position just before a next home index, the offset amount will be +0.25.

By adding the amount of offset to the target position as in the above, the head 40 is positioned based on servo signals recorded in the semi-circles (two concentric semi-circles, inner and outer) so that it moves obliquely across one track as the magnetic disc 21 rotates one turn. That is to say, a spiral orbit TL will be delineated as indicated in FIG. 11.

Given a track No. t+1 as a target position when the head 40 has come to a servo zone including a next home index, the head 40 will be positioned along the continuous spiral orbit.

By recording or reproducing data while positioning the head 40, a full spiral data track can be formed in a data zone.

For positioning with respect to the magnetic disc on which data is recorded in the servo format as in the fifth embodiment, the head 40 is moved only within a range of ±0.25 from the track center as evident from FIG. 11. Namely, since the head 40 is moved only within a range of ±0.25 in which the offset amount changes with a substantial linearity, a data track can be formed in an accurately spiral form.

The fifth embodiment of the present invention has been described concerning the example in which servo signals are recorded in semi-circles (two concentric semi-circles, inner and outer). With a servo writer capable of a higher resolution of the head moving pitch, servo signals may be recorded at smaller intervals.

Figure 12:
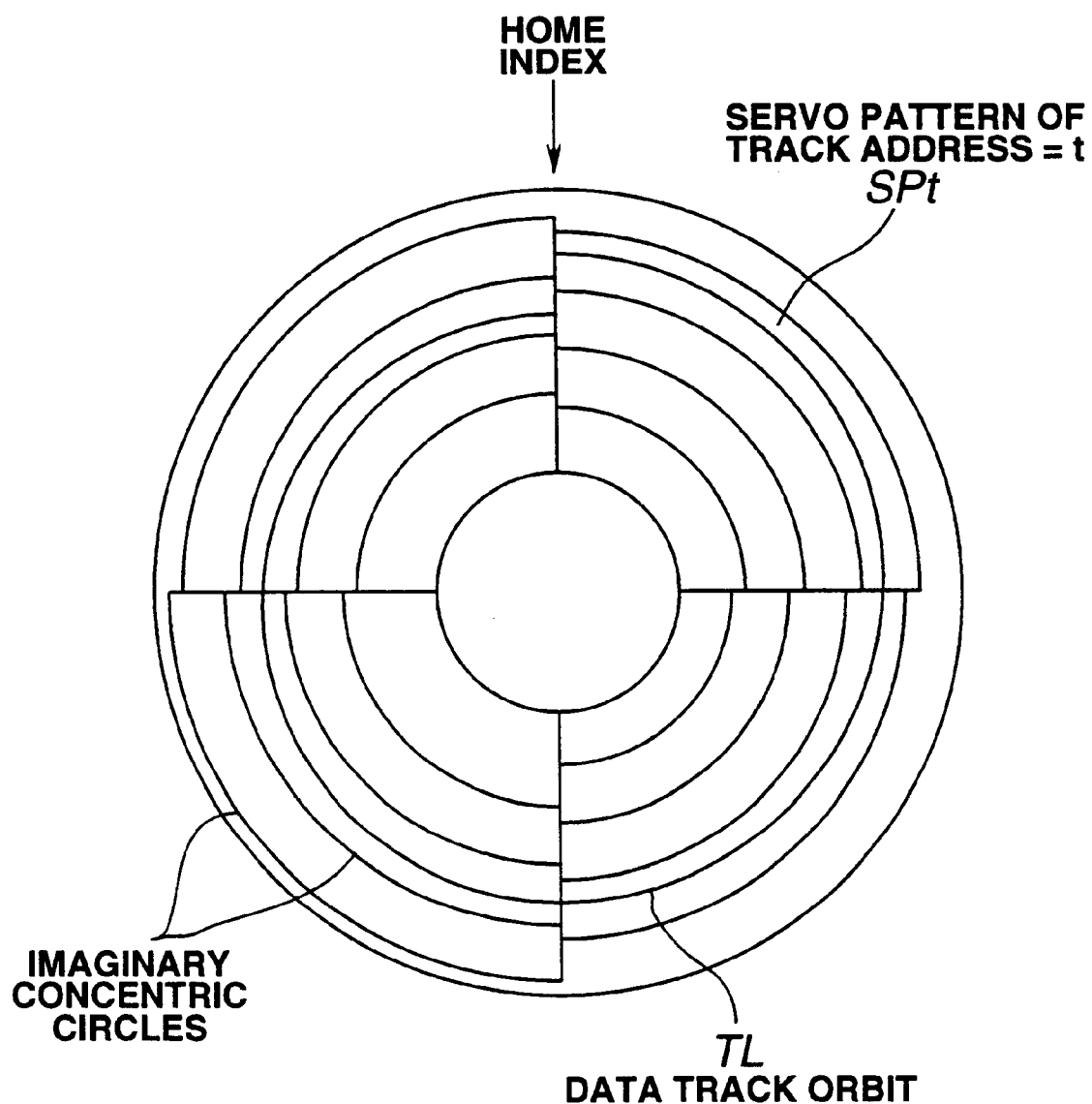
FIG. 12 illustrates, by way of example, a disc format in which quarter circular data tracks are formed according to a sixth embodiment of the present invention.

As illustrated in FIG. 12, by recording servo signals on quarter-circles (four concentric quarter-circles), for example, the head 40 can be moved only within a range of ±0.125 from the track center, so that the head 40 can be moved only within a range in which the fine signal linearity is much better.

As having been described in the foregoing, the fifth embodiment allows to form a spiral data track accurately since the head 40 is moved only within a range in which the linearity is relatively good, even if the linearity of a fine signal is not good, for example, about ±0.5.

The embodiments of the present invention have been described concerning a magnetic disc as a disc-shaped recording medium. It should be appreciated, however, that the present invention is applicable for an optical disc having similar concentric servo zones to those formed on the magnetic disc as mentioned in the foregoing.

According to the present invention, a positioning signal recorded on an arc forming a part of a concentric circle on a disc-shaped recording medium is detected, a circumferential position on the disc-shaped recording medium is detected, and an offset with respect to the positioning signal is determined from the circumferential position signal to control the head for a scan along a spiral orbit, thereby permitting to form a spiral data track without a higher accuracy of the conventional servo writer.

What is claimed is:

1. A data recording and/or reproducing apparatus wherein a signal recording and/or reproducing head is scanned over a disc-shaped recording medium on which a positioning signal for moving said signal recording and/or reproducing head to a predetermined position is recorded along an arc of a concentric circle, comprising:

means for detecting said positioning signal recorded along said arc;

detecting means for detecting a circumferential position of said signal recording and/or reproducing head on said disc-shaped recording medium; and calculating means for calculating an offset amount from a signal indicative of a detected circumferential position, wherein a calculated offset amount is added to said positioning signal for controlling said signal recording and/or reproducing head for scanning along a spiral orbit over said disc-shaped recording medium, and said arc forming a part of said concentric circle, along which said positioning signal is recorded, has a variable radius relative to changes in said circumferential position.

2. The data recording and/or reproducing apparatus as set forth in claim 1, wherein during idling with no data recording or reproduction, said signal recording and/or reproducing head is controlled for scanning along a concentric orbit over said disc-shaped recording medium.

3. The data recording and/or reproducing apparatus as set forth in claim 2, further comprising holding means for holding said offset amount, wherein said offset amount held by said holding means is added to said positioning signal for controlling said signal recording and/or reproducing head for scanning along said concentric orbit over said disc-shaped recording medium during idling with no data recording or reproduction.

4. The data recording and/or reproducing apparatus as set forth in claim 2, further comprising selecting means for selecting, depending upon a type of data to be recorded, whether said signal recording and/or reproducing head is to be controlled for scanning along one of said spiral and said concentric orbit over said disc-shaped recording medium.

5. The data recording and/or reproducing apparatus as set forth in claim 4, wherein said signal recording and/or reproducing head is controlled for scanning along said spiral orbit over a first side of said disc-shaped recording medium adapted for recording data on either side thereof, and along an inverted spiral orbit over a second side of said disc-shaped recording medium.

6. The data recording and/or reproducing apparatus as set forth in claim 1, further comprising selecting means for selecting, depending upon a type of data to be recorded, whether said signal recording and/or reproducing head is to be controlled for scanning along one of said spiral and said concentric orbit over said disc-shaped recording medium.

7. The data recording and/or reproducing apparatus as set forth in claim 1, wherein said signal recording and/or reproducing head is controlled for scanning along said spiral orbit over a first side of said disc-shaped recording medium adapted for recording data on either side thereof, and along an inverted spiral orbit over a second side of said disc-shaped recording medium.

8. The data recording and/or reproducing apparatus as set forth in claim 1, wherein said arc forming a part of said concentric circle, along which said positioning signal is recorded, has a variable radius relative to changes in said circumferential position.

9. The data recording and/or reproducing apparatus as set forth in claim 1, wherein said disc-shaped recording medium is rotated at a constant angular velocity.

10. A data recording and/or reproducing apparatus wherein a signal recording and/or reproducing head is scanned over a disc-shaped recording medium on which a positioning signal for moving said signal recording and/or reproducing head to a predetermined position is recorded along an arc of a concentric circle, comprising:

means for detecting said positioning signal recorded along said arc;

detecting means for detecting a circumferential position of said signal recording and/or reproducing head on said disc-shaped recording medium; and calculating means for calculating an offset amount from a signal indicative of a detected circumferential position, wherein a calculated offset amount is added to said positioning signal for controlling said signal recording and/or reproducing head for scanning along a spiral orbit over said disc-shaped recording medium, during idling with no data recording or reproduction, said signal recording and/or reproducing head is controlled for scanning along a concentric orbit over said disc-shaped recording medium, and said arc forming a part of said concentric circle, along which said positioning signal is recorded, has a variable radius relative to changes in said circumferential position.

11. A data recording and/or reproducing apparatus wherein a signal recording and/or reproducing head is scanned over a disc-shaped recording medium having recorded along an arc of a concentric circle, having a variable radius relative to changes in a circumferential position, a track address information signal for moving said signal recording and/or reproducing head to a predetermined radial position of said disc-shaped recording medium, comprising:

first detecting means for detecting, based on information read by said signal recording and/or reproducing head, said track address information signal recorded along a circular arc of said concentric circle;

second detecting means for detecting, based on information read by said signal recording and/or reproducing head, a circumferential position of said signal recording and/or reproducing head on said disc-shaped recording medium;

third detecting means for detecting, based on a signal indicative of said circumferential position on said disc-shaped recording medium, an offset amount with respect to said track address information signal; and controlling means for controlling, based on said track address information signal and said offset amount, said signal recording and/or reproducing head for scanning along a spiral orbit over said disc-shaped recording medium.

12. The data recording and/or reproducing apparatus as set forth in claim 11, wherein said signal recording and/or reproducing head is controlled for scanning along a concentric orbit over said disc-shaped recording medium during idling with no data recording or reproduction.

13. The data recording and/or reproducing apparatus as set forth in claim 12, further comprising selecting means for selecting, depending upon a type of data to be recorded, whether said signal recording and/or reproducing head is to be controlled for scanning along one of said spiral and said concentric orbit over said disc-shaped recording medium.

14. The data recording and/or reproducing apparatus as set forth in claim 12, further comprising holding means for holding said offset amount, wherein said offset amount held by said holding means is added to said positioning signal for controlling said signal recording and/or reproducing head for scanning along said concentric orbit over said disc-shaped recording medium during said idling with no data recording or reproduction.

* * * * *